(12) United States Patent  
Koulouh et al.

(10) Patent No.: US 12,366,342 B2  
(45) Date of Patent: Jul. 22, 2025

(54) DEVICE FOR DEHUMIDIFYING A CLOSED CASING

(71) Applicant: AML SYSTEMS, Paris (FR)

(72) Inventors: Hassan Koulouh, Lamorlaye (FR); Cyril Rivier, Chatou (FR); Claudio Chiattelli, Le Blanc-Mesniil (FR); Michel Rinzler, Paris (FR); Alexandre Aubry, Paris (FR)

(73) Assignee: AML SYSTEMS, Paris (FR)

( * ) Notice: Subject to any disclaimer, the term of this patent is extended or adjusted under 35 U.S.C. 154(b) by 0 days.

(21) Appl. No.: 18/725,065

(22) PCT Filed: Jan. 10, 2023

(86) PCT No.: PCT/EP2023/050448  
§ 371 (c)(1),  
(2) Date: Jun. 27, 2024

(87) PCT Pub. No.: WO2023/135130  
PCT Pub. Date: Jul. 20, 2023

(65) Prior Publication Data  
US 2025/0102130 A1    Mar. 27, 2025

(30) Foreign Application Priority Data  
Jan. 17, 2022 (FR) .................... FR2200346

(51) Int. Cl.  
*F21S 45/60* (2018.01)  
*B01D 53/04* (2006.01)  
*B01D 53/26* (2006.01)

(52) U.S. Cl.  
CPC .......... *F21S 45/60* (2018.01); *B01D 53/0438* (2013.01); *B01D 53/261* (2013.01);  
(Continued)

(58) Field of Classification Search  
CPC ............. F21S 45/30; F21S 45/33; F21S 45/60  
See application file for complete search history.

(56) References Cited

U.S. PATENT DOCUMENTS 5,174,330 A * 12/1992 Golestan .............. G05D 7/0133  
137/504  
5,265,643 A * 11/1993 Golestan .............. G05D 7/0133  
137/504  
(Continued)

FOREIGN PATENT DOCUMENTS

CN     110726118 A     1/2020  
EP        1818609 A2 *  8/2007  ........... B01D 53/261  
(Continued)

*Primary Examiner* — Alexander K Garlen  
(74) *Attorney, Agent, or Firm* — Aird & McBurney LP

(57) ABSTRACT

Device for dehumidifying a closed casing.  
The device for dehumidifying comprises a box comprising an inlet communicating with the interior of the closed casing and an outlet, a heating module able to be controlled to generate heat, a desiccant configured to adsorb moisture when it is not heated by the heating module and to return adsorbed moisture by desorption when it is heated by the heating module, a mobile plug able to be moved to alternately open and close the inlet and the outlet, a bias spring configured to move the mobile plug when the heating module does not heat the desiccant and a shape memory alloy spring configured to move the mobile plug when the heating module heats the desiccant, said shape memory alloy spring being able to be heated by the heating module at the same time as the desiccant. The device for dehumidifying is suited for dehumidifying any type of closed casing, it is cost efficient both in design and in power consumption, and it is easy to implement thanks to its small size and its simple design.

14 Claims, 4 Drawing Sheets

(52) U.S. Cl.
CPC ...... *B01D 2257/80* (2013.01); *B01D 2258/06* (2013.01); *B01D 2259/40096* (2013.01); *B01D 2259/4566* (2013.01)

(56) References Cited

U.S. PATENT DOCUMENTS

| | | | | |
|---|---|---|---|---|
| 5,980,074 | A * | 11/1999 | Hwang | F21S 45/33 |
| | | | | 362/547 |
| 2003/0133310 | A1* | 7/2003 | VanDuyn | F21S 45/33 |
| | | | | 362/547 |
| 2013/0032115 | A1* | 2/2013 | Zitarosa | F16K 17/0493 |
| | | | | 123/188.8 |
| 2013/0133761 | A1* | 5/2013 | Cull | F16K 17/02 |
| | | | | 137/528 |
| 2015/0070927 | A1* | 3/2015 | Kurahashi | B01D 53/26 |
| | | | | 362/546 |
| 2017/0015235 | A1 | 1/2017 | Puente et al. | |
| 2017/0248246 | A1* | 8/2017 | Valentin | F16K 47/023 |
| 2018/0128445 | A1 | 5/2018 | Lee et al. | |
| 2018/0142857 | A1* | 5/2018 | Park | F21S 45/33 |
| 2018/0335150 | A1* | 11/2018 | Hessling-Von Heimendahl | |
| | | | | F21V 31/03 |
| 2019/0255482 | A1* | 8/2019 | Ball | B01D 53/28 |
| 2019/0299152 | A1 | 10/2019 | Alexander et al. | |
| 2021/0088197 | A1* | 3/2021 | Koulouh | F21S 45/60 |
| 2021/0127511 | A1* | 4/2021 | Schulz | H05K 5/0213 |
| 2022/0219116 | A1* | 7/2022 | Foo | B01J 20/3236 |

FOREIGN PATENT DOCUMENTS

| | | |
|---|---|---|
| EP | 3393219 A1 | 10/2018 |
| WO | 2020242454 A1 | 12/2020 |

* cited by examiner

DEVICE FOR DEHUMIDIFYING A CLOSED CASING

CROSS REFERENCE TO RELATED APPLICATIONS

This application is the U.S. National Phase Application under 35 U.S.C. § 371 of International Patent Application No. PCT/EP2023/050448 filed on Jan. 10, 2023, which claims priority to French Patent Application FR2200346 filed on Jan. 17, 2022. The disclosures of the aforementioned applications are hereby incorporated by reference in their entireties.

TECHNICAL FIELD

The present disclosure deals with a device for dehumidifying a closed casing. The device is particularly suited to be used to remove humidity from a headlamp casing of a vehicle.

BACKGROUND

In many fields of activity, there is a need to place pieces of equipment in closed casing for different purposes. For example, a closed casing can be used to protect a device from external threats. Yet, a closed casing is likely to favour the appearance of humidity within said casing, especially for outdoor implementations, which can be detrimental for the device contained in the casing.

For instance, a vehicle headlamp comprises a closed casing having a glass and a light source inside the closed casing. Such headlamp is usually not completely sealed. Thus humidity can penetrate inside the casing of the headlamp. This humidity can be harmful for electrical components of the headlamp. It can also condense on the lens or the glass of the headlamp. This condensation has an influence on the lighting of the headlamp which can lead to a deterioration of its efficiency.

A solution is to use a device in order to remove the humidity of the headlamp. Such a device usually comprises a desiccant for adsorbing the humidity in the air and a heat source for heating the desiccant. The heating makes the desiccant release by desorption the humidity previously adsorbed. This device also comprises shutters which, alternately, open and close openings so that a space of the device containing the desiccant communicates with the inside and the outside of the casing of the headlamp. The shutters are driven by an electrical motor in a rotation movement.

Nevertheless, this solution requires a complex electrical implementation and a large power consumption. In consequence, this solution is not totally satisfying.

SUMMARY

A purpose of the present disclosure is to overcome the shortcomings of the state of the art by proposing a device for dehumidifying a closed casing.

According to the disclosure herein, the device for dehumidifying comprises at least:
- a box defining a chamber comprising at least one inlet and one outlet, the inlet being configured so that the chamber communicates with the interior of the closed casing and the outlet being configured so that the chamber communicates with the exterior of the closed casing;
- a heating module able to be controlled to generate heat;
- a desiccant configured to adsorb moisture inside the chamber when said desiccant is not heated by the heating module and to return adsorbed moisture by desorption when said desiccant is heated by the heating module;
- at least one mobile plug able to be moved alternately to at least a first position and a second position, said mobile plug being configured to open the inlet and close the outlet in the first position and to close the inlet and open the outlet in the second position;
- a bias spring configured to move the mobile plug to the first position when the heating module does not heat the desiccant;
- a shape memory alloy spring able to be heated by the heating module at the same time as the desiccant, said shape memory alloy spring being configured to move the mobile plug in the second position when the heating module heats the desiccant.

Thus, the device for dehumidifying is a device suited for dehumidifying any type of closed casing which movable parts are actuated by a shape memory alloy spring. Such a device for dehumidifying is cost efficient both in design and in power consumption. It is also easy to be implemented on vehicle headlight, for example, thanks to its small size and its simple design.

According to an embodiment, the mobile plug of the device for dehumidifying comprises:
- an adsorption flap configured to open the inlet when the mobile plug is in the first position and close the inlet when the mobile plug is in the second position; and
- a desorption flap configured to close the outlet when the mobile plug is in the first position and open the outlet when the mobile plug is in the second position.

According to a specific embodiment:
- the adsorption flap of the mobile plug comprises a first sealing face configured to be pressed against or moved away from an input wall of the box containing the inlet to respectively open or close said inlet by being moved according to a translation movement along a first translation axis substantially perpendicular to the input wall,
- the desorption flap of the mobile plug comprises a second sealing face configured to be pressed against or moved away from an output wall of the box containing the outlet to respectively open or close said outlet by being moved according to a translation movement along a second translation axis substantially perpendicular to the output wall.

According to another specific embodiment, the adsorption flap is integral with the desorption flap, and said adsorption flap and desorption flap are configured so that the first translation axis is coincident with the second translation axis. Thus the mobile plug is moved to the first position and to the second position according to a single direction of translation.

In a non-limitative example, the mobile plug comprises a first housing and the heating module comprises a first guiding shape. The bias spring is configured to be accommodated inside the first housing and mounted on the guiding shape so that said bias spring is able to push the mobile plug into the first position by resting against the heating module.

In another non-limitative example, the heating module comprises a second housing and the mobile plug comprises a second guiding shape. The shape memory alloy spring is configured to be accommodated inside the second housing and mounted on the guiding shape so that said shape memory alloy spring is able to push the mobile plug into the second position by resting against the heating module.

In addition, the heating module can comprise at least a resistive element configured to generate heat and a heat sink configured to dissipate the heat generated by the resistive element. The resistive element is provided with at least a flexible printed circuit having a positive temperature coefficient ink. The desiccant is attached to the heat sink so that said heat sink is able to transfer the heat generated by the resistive element to the desiccant.

According to an embodiment, the second housing of the heating module is made of a heat-conductive material and connected to the heat sink. The second housing is able to transfer heat generated by the heating module to the shape memory alloy spring.

In a non-limitative example, the heat sink of the heating module is provided with a flat shape.

According to an embodiment, the desiccant corresponds to at least one desiccant pad. Moreover, the desiccant can be arranged around the heat sink of the heating module. Preferably, the desiccant is arranged on the heat sink of the heating module with a surface contact.

In a non-limitative example, the device for dehumidifying comprises at least a first sealing element and a second sealing element arranged on the mobile plug. The second sealing element is able to seal the outlet when the mobile plug is in the first position and the first sealing element is able to seal the inlet when the mobile plug is in the second position.

Additionally, the box of the device for dehumidifying can be provided with a round shape.

The disclosure herein further relates to a vehicle headlamp comprising at least a closed casing housing a light source. The vehicle headlamp comprises a device for dehumidifying. Especially, the device for dehumidifying is able to dehumidify the closed casing by being arranged on the vehicle headlamp so that the chamber of the box communicates with the interior of the closed casing via the inlet and communicates with the exterior of the closed casing via the outlet.

BRIEF DESCRIPTION OF THE DRAWINGS

The disclosure herein, with its features and advantages, will emerge more clearly on reading the description given with reference to the appended drawings in which.

DETAILED DESCRIPTION

The following description is provided with reference to the abovementioned figures.

Figure 1:
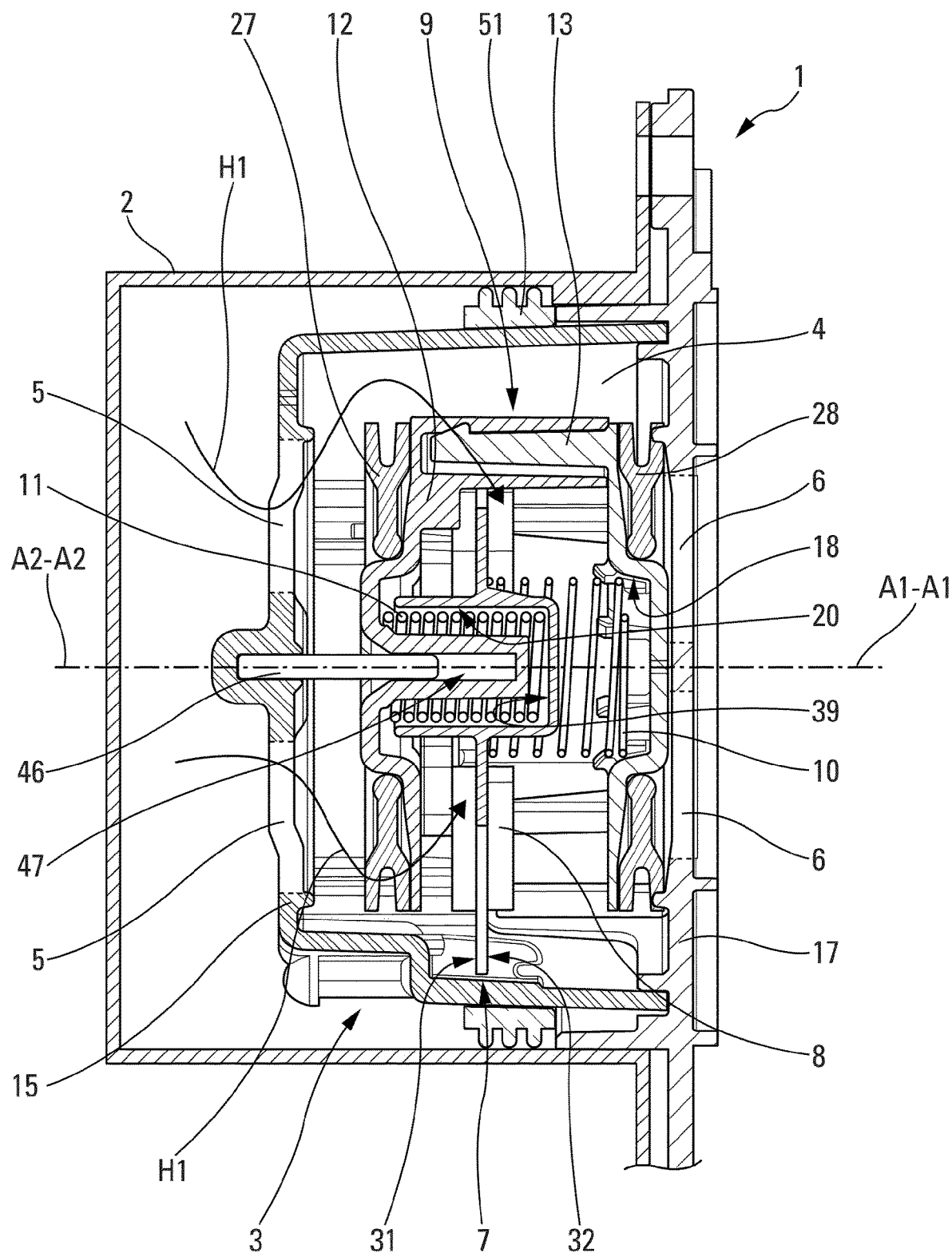
FIG. 1 shows a cross-sectional view of a device for dehumidifying a closed casing comprising a mobile plug is in a first position.
Figure 3:
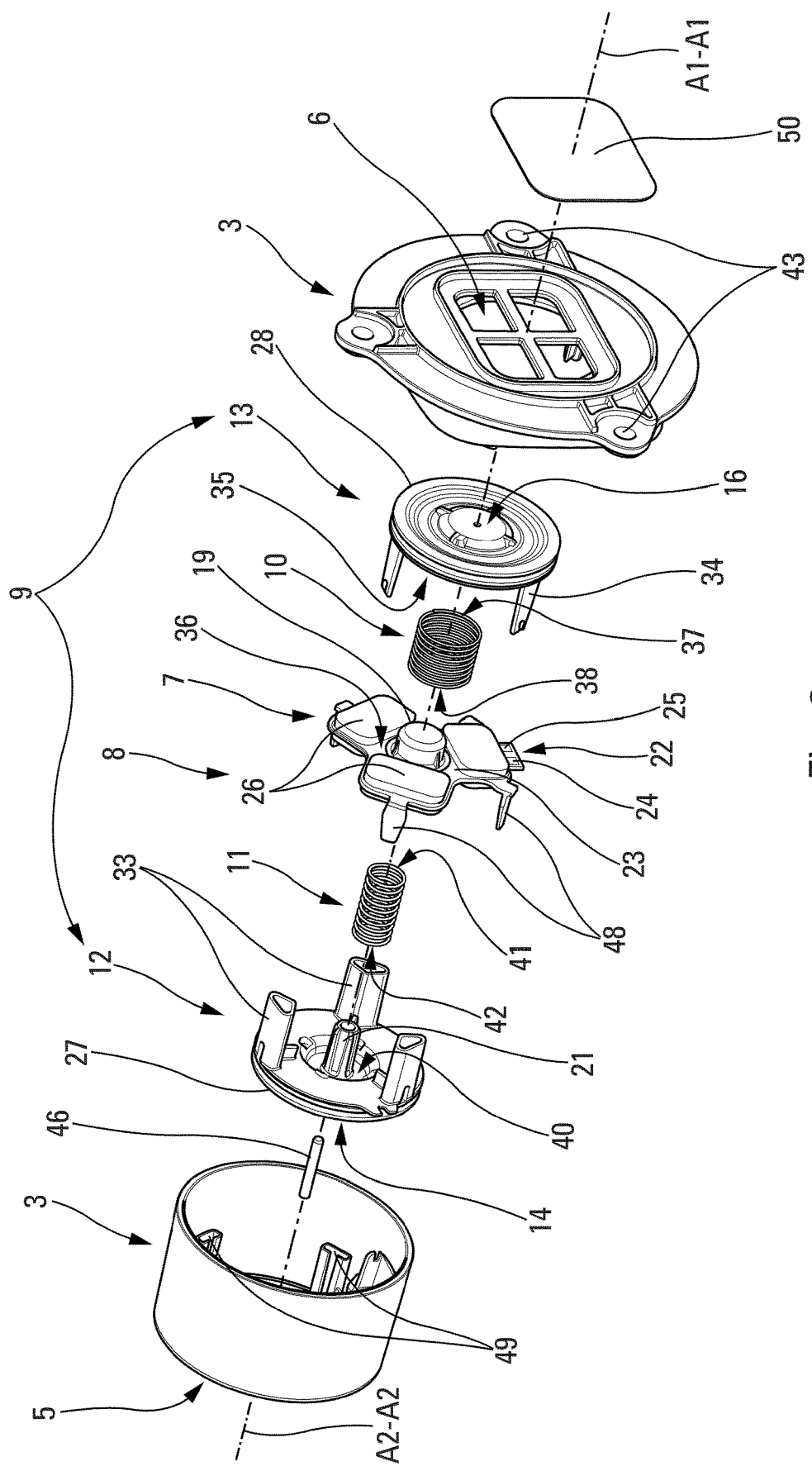
FIG. 3 shows an exploded view of the device for dehumidifying a closed casing.

The invention concerns a device for dehumidifying 1 a closed casing 2, as shown in particular embodiments on [FIG. 1] to [FIG. 3]. The device for dehumidifying 1 is suitable for being used to dehumidify, that is to say to remove humidity or to prevent humidity from occurring in any closed casing. The device for dehumidifying 1 is particularly suitable for being implemented in a vehicle headlamp 29, as shown in a specific embodiment on [FIG. 4].

In one embodiment, as shown on [FIG. 1] to [FIG. 3], the device for dehumidifying 1 comprises a box 3 defining a chamber 4 inside said box 3. The box 3 is provided with an inlet 5 and an outlet 6. In an embodiment, the inlet 5 and the outlet 6 are arranged through two opposite walls: an input wall 15 opposing an output wall 17. The inlet 5 is arranged through the input wall 15 of the box 3 and the outlet 6 is arranged through the output wall 17 of the box 3. The inlet 5 and the outlet 6 can correspond to vents through which air, especially humidity laden air, is able to pass. In different embodiments, these vents can be a single opening or a plurality of openings with varied sizes and shapes.

The inlet 5 is configured so that the chamber 4 communicates with the interior of the closed casing 2. The outlet 6 is configured so that the chamber 4 communicates with the exterior of the closed casing 2, for example an outdoor environment.

In the present description, an environment communicating with another environment means that there can be an exchange of fluid, such as water vapor, air, between both environments.

Furthermore, the device for dehumidifying 1 comprises a heating module 7 configured to generate heat. The device for dehumidifying 1 also comprises a desiccant 8 able to adsorb and desorb humidity. The desiccant 8 is configured so that it can be heated by the heating module 7. Especially, the desiccant 8 is configured to adsorb humidity inside the chamber 4 when said desiccant 8 is not heated by the heating module 7. The air laden with humidity contained in the closed casing 2 can pass through the inlet 5 to penetrate into the chamber 4 as shown by arrows H1 on FIG. 1. The desiccant 8 is also configured to release adsorbed humidity by desorption when said desiccant 8 is heated by the heating module 7. The humidity released by the desiccant 8 fills the air in the chamber 4 with said humidity. The air laden with humidity contained in the chamber 4 can pass through the outlet 6 outside the closed casing as shown by arrows H2 on [FIG. 2].

Moreover, the device for dehumidifying 1 comprises a mobile plug 9 configured to alternately open or close the inlet 5 and the outlet 6. To do so, the mobile plug 9 is able to be moved into at least two different positions. The mobile plug 9 is configured to be moved to a first position, in which it opens the inlet 5 and closes the outlet 6, as shown on FIG. 1. The mobile plug 9 is also configured to be moved to a second position in which it closes the inlet 5 and opens the outlet 6, as shown on [FIG. 2].

The device for dehumidifying 1 comprises a bias spring 10 and a shape memory alloy spring 11 able to move the mobile plug 9. The bias spring 10 is configured to move the mobile plug 9 to the first position. The shape memory alloy spring 11 is configured to move the mobile plug 9 to the second position. The shape memory alloy spring 11 is able to be heated by the heating module 7 at the same time as the desiccant 8.

Indeed, a shape memory alloy spring is a spring that can have at least two different states depending on its temperature. For example, when it is cold (at ambient temperature) it can be deformed and when it is heated at a particular temperature it can return to a "remembered" shape.

When the desiccant 8 is not heated by the heating module 7, the shape memory ally spring 11 is not heated by the heating module 7 too. Thus, the shape memory alloy spring 11 is in a state in which it can be deformed. In this case, as represented on FIG. 1, the bias spring 10 is configured to have a stiffness allowing said bias spring 10 to exert a greater effort on the mobile plug 9 than the effort exerted by the shape memory alloy spring 11. In consequence, the mobile plug 9 is moved to the first position.

When the desiccant 8 is heated by the heating module 7, the shape memory alloy spring 11 is also heated by the heating module 7. Thus, the shape memory spring 11 is in a state in which it returns to a predefined ("remembered") shape. In this case, as represented on [FIG. 2] in a specific embodiment, the shape memory alloy spring 11 has a stiffness allowing said shape memory alloy spring 11 to exert a greater effort on the mobile plug 9 than the effort exerted by the bias spring 10. In consequence, the mobile plug 9 is moved to the second position.

In the present case, the bias spring 10 and the shape memory alloy spring 11 are both compression springs. However, in other embodiments, the bias spring 10 and the shape memory alloy spring 11 can correspond to any other type of spring able to move the mobile plug 9 to the first position and/or to the second position.

The device for dehumidifying 1, as described above, provides a device suited for dehumidifying any type of closed casing which movable parts are actuated by a shape memory alloy spring. Such a device for dehumidifying 1 is cost efficient both in design and in power consumption. It is also easy to implement thanks to its small size and its simple design.

In an embodiment, as represented on [FIG. 1] to [FIG. 3], the mobile plug 9 comprises an adsorption flap 12 and a desorption flap 13. The adsorption flap 12 is configured to open the inlet 5 when the mobile plug 9 is in the first position (FIG. 1) and close the inlet 5 when the mobile plug 9 is in the second position ([FIG. 2]). The desorption flap 13 is configured to, close the outlet 6 when the mobile plug 9 is in the first position and open the outlet 6 when the mobile plug 7 is in the second position.

According to an embodiment, as shown on [FIG. 1] to [FIG. 3], the heating module 7 is integral with the chamber 4 of the box 3. Preferably, the heating module 7 is arranged in a central position between the two opposite wall of the box 3: the input wall 15 and the output wall 17. The inlet 5 is arranged through the input wall 15. The outlet 6 is arranged through the output wall 17. The heating module 7 can comprise a face 31 oriented towards the input wall 15 and a face 32 oriented towards the output wall 17.

In order to be fastened in the box 3, the heating module 7 can comprise fastening elements. For example, as shown on [FIG. 3], the heating module 7 can comprise tabs 48 protruding from the face 31. The box 3 can be provided with rails 49 in the chamber 4. The rails 49 are configured so that the tabs 48 can be slide in said rails 49 to position and secure the heating module 7 in the chamber 4.

The mobile plug 9 is configured so that each one of the adsorption flap 12 and the desorption flap 13 is arranged on a different side of the heating module 7. The adsorption flap 12 is arranged between the face 31 and the input wall 15. The desorption flap 13 is arranged between the face 32 and the output wall 17.

Moreover, the adsorption flap 12 can comprise a sealing face 14 oriented towards the input wall 15. The sealing face 14 is able to close the inlet 5 by being pressed against the input wall 15 or open said inlet 5 by being moved away from said input wall 15. Similarly, the desorption flap 13 can comprise a sealing face 16 oriented towards the output wall 17. The sealing face 16 is able to close the outlet 6 by being pressed against the output wall 17 or open said outlet 6 by being moved away from said output wall 17.

On the one hand, the adsorption flap 12 is configured to be pressed against or moved away from the input wall 15 according to a translation movement along a translation axis A1-A1. Preferably, the translation axis A1-A1 is substantially perpendicular to the input wall 15.

On the other hand, the desorption flap 13 is configured to be pressed against or moved away from the output wall 17 according to a translation movement along a translation axis A2-A2. Preferably, the translation axis A2-A2 is substantially perpendicular to the output wall 17.

In a preferred variant of this embodiment, as shown on [FIG. 1] to [FIG. 3], the adsorption flap 12 is integral with the desorption flap 13. The adsorption flap 12 can be provided with hollow extensions 33. The desorption flap 13 can be provided with bracket extensions 34. The bracket extensions 34 of the desorption flap 13 have a shape configured to fit into the hollow extensions 33 of the adsorption flap 12 so that the adsorption flap 12 and the desorption flap 13 can be clipped together.

Since the adsorption flap 12 is integral with the desorption flap 13, they can move together along the same direction. Thereby, in this preferred embodiment, the adsorption flap 12 and the desorption flap 13 are moved according to a single translation direction. That is to say that the translation axis A1-A1 of the adsorption flap 12 is coincident with the translation axis A2-A2 of the desorption flap 13.

In a specific embodiment, as shown on [FIG. 1] to [FIG. 3], the translation movement of the mobile plug 9 can be achieved as described below.

The bias spring 10 is arranged between the face 32 of the heating module 7 and the mobile plug 9. On the one hand, the mobile plug 9 comprises a supporting surface 35 oriented towards the inside of the chamber 4, facing the face 32 of the heating module 7. The supporting surface 35 comprises a housing 18. In this specific embodiment, the housing 18 corresponds to an indentation having a cylindrical shape. On the other hand, the heating module 7 comprises, on its face 32, a supporting surface 36 provided with a guiding shape 19. In this specific embodiment shown on [FIG. 1] to [FIG. 3], the guiding shape 19 corresponds to a cylindrical shape protruding perpendicularly from the supporting face 36.

The bias spring 10 is configured to be arranged between the housing 18 and the guiding shape 19. Especially, a first end 37 of the bias spring 10 is accommodated inside the housing 18, seating on the supporting surface 35. A second end 38 of the bias spring 10 is mounted on the guiding shape 19, seating on the supporting surface 36. The housing 18 is aligned with the guiding shape 19. This alignment is configured so that the bias spring 10, thus arranged, is able to push the mobile plug 9 to the first position according to the translation axis A1-A1.

The shape memory alloy spring 11 is arranged between the face 32 of the heating module 7 and the mobile plug 9. On the one hand, the heating module 7 comprises, on its face 32, a housing 20. In this specific embodiment shown on [FIG. 1] to [FIG. 3], the housing 20 corresponds to a blind bore having a blind end 39. On the other hand, the mobile plug 9 comprises a supporting surface 40 provided with a guiding shape 21. In this specific embodiment, the guiding shape 21 corresponds to a cylindrical shape protruding perpendicularly from the supporting face 40.

The shape memory alloy spring 11 is configured to be arranged between the housing 20 and the guiding shape 21. Especially, a first end 41 of the shape memory alloy spring 11 is accommodated inside the housing 20, seating on the blind end 39. A second end 42 of the shape memory alloy spring 11 is mounted on the guiding shape 21, seating on the supporting surface 40. The housing 20 is aligned with the guiding shape 21. This alignment is configured so that the shape memory alloy spring 11, thus arranged, is able to push the mobile plug 9 to the second position according to the translation axis A2-A2.

In a specific embodiment, as shown on [FIG. 1] to [FIG. 3], the device for dehumidifying 1 comprises a guiding pin 46. The guiding ping 46 is secured to the box 3 in the chamber 4. In particular, the guiding pin 46 is arranged on the input wall 15 so that said guiding pin 46 protrudes towards mobile plug 9 along the direction of the translation axes A1-A1 and A2-A2. The mobile plug 9 comprises a guiding housing 47 on the sealing face 14 of the adsorption flap 12. The mobile plug 9 is configured so that the guiding housing 47 is aligned with the guiding pin 46. Thereby, the guiding housing 47 of the mobile plug 9 is able to be mounted on the guiding pin 46 so that said mobile plug 9 is guided in translation along said guiding pin 46.

The heating module 7 can comprise a resistive element 22 able to generate heat. Especially, the resistive element 22 is provided with at least a flexible printed circuit 24 having a positive temperature coefficient ink 25. The flexible printed circuit 24 with positive temperature coefficient ink 25 has many advantages:

- it is a self-regulated heating element which provides quick response in temperature;
- it is able to spread heat evenly around;
- the flexibility of the flexible printed circuit 24 allows varied shapes and sizes which can simplify its implementation;
- it can be formed from a wide range of materials.

The heating module 7 also comprises a heat sink 23 configured to dissipate the heat generated by the resistive element 22. The heat sink 23 can correspond to a standard heat conductive element on which the resistive element 22 is arranged.

The desiccant 8 is attached to the heat sink 23 so that said heat sink 23 is able to transfer the heat generated by the resistive element 22 to the desiccant 8.

The heating module 7 can be controlled by sensors arranged inside the closed casing 2. Such sensors, for example a humidity sensor, can be used to activate the heating module 7 when the closed casing 2 needs to be dehumidify.

In a specific embodiment, as shown on [FIG. 1] to [FIG. 3], the housing 20 of the heating module 7, in which the shape memory alloy spring 11 is accommodated, is made of a heat-conductive material. The housing 20 is connected to the heat sink 23 so that said housing 20 is able to transfer the heat generated by the heating module 7 to the shape memory alloy spring 11. Thereby, the heat sink 23 is able to heat the shape memory alloy spring 11 through the housing 20 while heating the desiccant 8.

In a preferred variant of the preceding embodiments, the heat sink 23 of the heating module 7 is provided with a flat shape.

Furthermore, the desiccant 8 can correspond to a desiccant pad 26. Especially, the desiccant 8 can be arranged around the heat sink 23. In a specific arrangement, the desiccant 8 can be arranged on the heat sink 23 with a surface contact.

In the specific embodiment shown on [FIG. 1] to [FIG. 3], the desiccant 8 corresponds to a plurality of desiccant pads 26 having a rectangular shape. In this embodiment, the heat sink 23 of the heating module 7 is flat and is arranged substantially perpendicular to the translation direction of the mobile plug 9 (translation axis A1-A1 et A2-A2). The desiccant pads 26 are arranged directly on both sides the heat sink 23 corresponding to the faces 31 and 32 of the heating module 7.

Additionally, the device for dehumidifying 1 comprises sealing elements able to seal the inlet 5 and the outlet 6. Especially, the mobile plug 9 comprises a sealing element 27 arranged on its sealing face 14 and a sealing element 28 arranged on its sealing face 16. The sealing element 27 is configured to seal the inlet 5 when the mobile plug 9 is in the second position. The sealing element 28 is configured to seal the outlet 6 when the mobile plug 9 is in the first position.

The sealing elements 28 and 29 can correspond to standard joints, for example flat seals, ring type seals or lip seals.

The device for dehumidifying 1 can comprises filtering elements arranged on the inlet 5 and the outlet 6. For example, as shown on [FIG. 3], a filter 50 can be arranged on the outlet 6. The filter 50 can be configured to avoid foreign matter to penetrate inside the chamber 4 of the device for dehumidifying 1. The filter 50 can also be configured to let humidity inside the chamber 4 go through said filter 50 to be evacuated out of the closed casing 2.

In addition, the box 3 of the device for dehumidifying 1 can be provided with a round shape. The box 3 can also comprises fastening elements 43 to fasten the device for dehumidifying 1 on the closed casing 2 it is intended to dehumidify. The fastening element 43 can be configured to fasten the box 3 via bolts, as shown in the embodiment on [FIG. 1] to 3, or via clipping elements. In other embodiments, the fastening element 43 can be configured so that the round shape of the box 3 is directly screwed in a shape of the closed casing 2 provided for that purpose.

Figure 2:
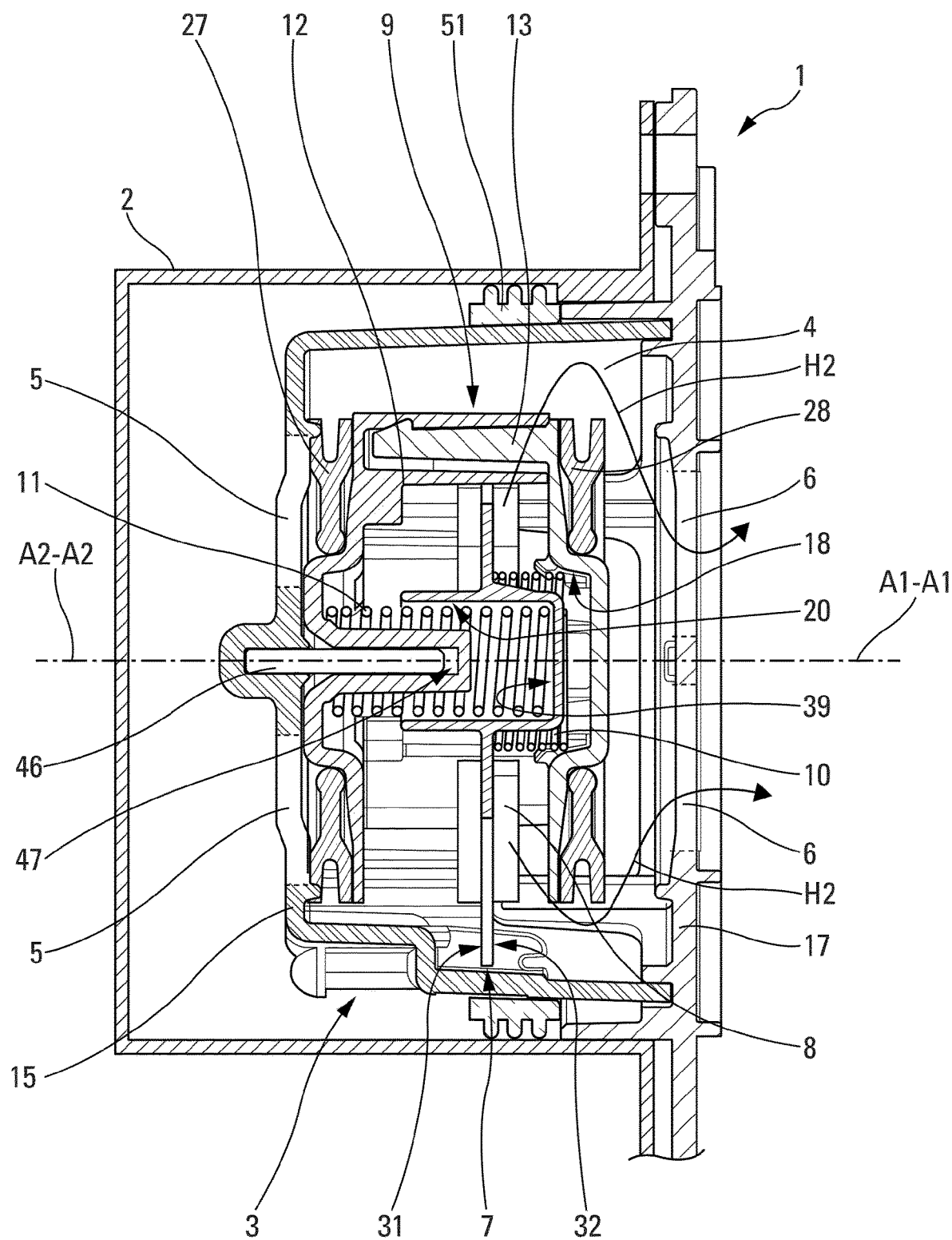
FIG. 2 shows a cross-sectional view of a device for dehumidifying a closed casing comprising a mobile plug is in a second position.

The box 3 can comprise a sealing element 51 arranged between said box 3 and the closed casing 2, as shown schematically of [FIG. 1] and [FIG. 2]. For example, the sealing element 51 can be arranged on the outside of the round shape of the box 3. The sealing element 51 is configured to hermetically seal the interface of the assembly of the box 3 with the closed casing 2.

Figure 4:
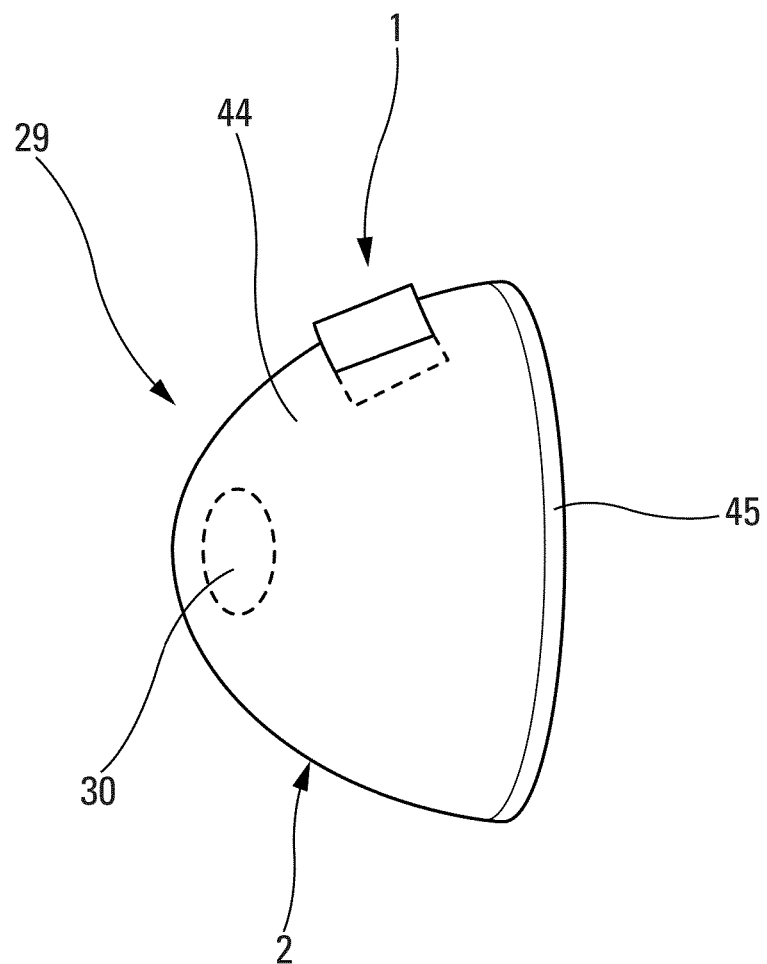
FIG. 4 shows a schematic view of a headlamp comprising a device for dehumidifying a closed casing of said a headlamp.

The invention also concerns a vehicle headlamp 29, as shown in a specific embodiment on [FIG. 4]. The vehicle headlamp 29 comprises a closed casing 2 housing a light source 30. For instance, the closed casing 2 can comprise a wall 44 and a glass 45 intended to be oriented towards the exterior of the vehicle. The vehicle headlamp 29 comprises the device for dehumidifying 1 disclosed above. Especially, the device for dehumidifying 1 is arranged on the closed casing 2 so that the chamber 4 of the box 3 communicates with the interior of said closed casing 2 via the inlet 5 and communicates with the exterior of the closed casing 2 via the outlet 6. For example, as shown schematically on [FIG. 4], the device for dehumidifying 1 can be secured to the wall 44 of the closed casing 2.

In a specific embodiment, the device for dehumidifying 1 can comprise sensor or sensors arranged inside the closed casing 2 of the vehicle headlamp 29. The sensor or sensors are configured to determine the humidity rate inside the closed casing 2. This sensor or these sensors can be configured to activate the heating module 7 when the closed casing 2 needs to be dehumidify, for example when the humidity rate reaches a predetermined maximum humidity rate.

The device for dehumidifying 1 can work as follows.

In a first step, the heating module 7 is not activated. The device for dehumidifying 1 is in a configuration in which the chamber 4 communicates with the interior of the closed casing 2. In this first step, the mobile plug 9 is in the first position, which means that the inlet 5 is open and the outlet 6 is closed. The desiccant 8 is able to adsorb the humidity present in the air of the closed casing 2, as shown schematically by the arrows H1 on FIG. 1.

In a second step, the heating module 7 is activated. The heating module 7 generates heat that is transferred to the desiccant 8 and to the shape memory alloy spring 11. The shape memory alloy spring 11 returns to its "remembered" shape, pushing the mobile plug 9 in the second position. The inlet 5 is closed by the mobile plug 9 and the outlet 6 is open. Thus, the chamber 4 communicates with the exterior of the closed casing 2. The desiccant 8, heated by the heating module 7, releases the humidity adsorbed by desorption. The desorbed humidity can be evacuated out of the closed casing 2, as shown schematically by the arrows H2 on [FIG. 2].

In a third step, the heating module is deactivated. The desiccant 8 and the shape memory alloy spring 11 are no longer heated by the heating module 7. The shape memory alloy spring 11 is back to a deformable shape and the bias spring 10 is able to push the mobile plug 9 back into the first position. The device for dehumidifying 1 is again in the configuration of the first step in which the chamber 4 communicates with the interior of the closed casing 2. The desiccant 8 is ready to adsorb humidity from inside the closed casing 2 again.

The steps are then repeated.

The device for dehumidifying 1 as described above provides many advantages. It provides a device suited for dehumidifying any type of closed casing.

Especially, the device for dehumidifying 1:
provides a low design cost;
can easily be designed with varied sizes and shapes, especially small sizes and round shapes;
grants an efficient sealing via the translation movements of the sealing parts;
is easy to implement, especially physically and electrically;
requires a reduced amount of desiccant;
has a low power consumption;
is noiseless.

The invention claimed is:

1. Device for dehumidifying a closed casing, characterized in that it comprises at least:
a box defining a chamber comprising at least one inlet and one outlet, the inlet being configured so that the chamber communicates with the interior of the closed casing and the outlet being configured so that the chamber communicates with the exterior of the closed casing;
a heating module able to be controlled to generate heat;
a desiccant configured to adsorb moisture inside the chamber when said desiccant is not heated by the heating module and to return adsorbed moisture by desorption when said desiccant is heated by the heating module;
at least one mobile plug able to be moved alternately to at least a first position and a second position, said mobile plug being configured to open the inlet and close the outlet in the first position and to close the inlet and open the outlet in the second position;
a bias spring configured to move the mobile plug to the first position when the heating module does not heat the desiccant; and
a shape memory alloy spring able to be heated by the heating module at the same time as the desiccant, said shape memory alloy spring being configured to move the mobile plug in the second position when the heating module heats the desiccant,
the mobile plug comprising:
an adsorption flap configured to open the inlet when the mobile plug is in the first position and close the inlet when the mobile plug is in the second position; and
a desorption flap configured to close the outlet when the mobile plug is in the first position and open the outlet when the mobile plug is in the second position.

2. Device for dehumidifying according to claim 1, characterized in that
the adsorption flap comprises a first sealing face configured to be pressed against or moved away from an input wall of the box containing the inlet to respectively open or close said inlet by being moved according to a translation movement along a first translation axis substantially perpendicular to the input wall,
the desorption flap comprises a second sealing face configured to be pressed against or moved away from an output wall of the box containing the outlet to respectively open or close said outlet by being moved according to a translation movement along a second translation axis substantially perpendicular to the output wall.

3. Device for dehumidifying according to claim 2, characterized in that the adsorption flap is integral with the desorption flap, said adsorption flap and desorption flap being configured so that the first translation axis is coincident with the second translation axis, thus the mobile plug is moved to the first position and to the second position according to a single direction of translation.

4. Device for dehumidifying according to claim 1, characterized in that,
the mobile plug comprises a first housing;
the heating module comprises a first guiding shape,
the bias spring being configured to be accommodated inside the first housing and mounted on the guiding shape so that said bias spring is able to push the mobile plug into the first position by resting against the heating module.

5. Device for dehumidifying according to claim 1, characterized in that,
the heating module comprises a second housing;
the mobile plug comprises a second guiding shape,
the shape memory alloy spring being configured to be accommodated inside the second housing and mounted on the guiding shape so that said shape memory alloy spring is able to push the mobile plug into the second position by resting against the heating module.

6. Device for dehumidifying according to claim 1, characterized in that the heating module comprises at least
a resistive element provided with at least a flexible printed circuit having a positive temperature coefficient ink, said resistive element being configured to generate heat,
a heat sink configured to dissipate the heat generated by the resistive element, the desiccant being attached to the heat sink so that said heat sink is able to transfer the heat generated by the resistive element to the desiccant.

7. Device for dehumidifying according to claim 5, characterized in that the second housing of the heating module is made of a heat-conductive material and connected to the heat sink so that said second housing is able to transfer heat generated by the heating module to the shape memory alloy spring.

8. Device for dehumidifying according to claim 5, characterized in that the heat sink of the heating module is provided with a flat shape.

9. Device for dehumidifying according to claim 1, characterized in that the desiccant corresponds to at least one desiccant pad.

10. Device for dehumidifying according to claim 1, characterized in that the desiccant is arranged around the heat sink of the heating module.

11. Device for dehumidifying according to claim 6, characterized in that the desiccant is arranged on the heat sink of the heating module with a surface contact.

12. Device for dehumidifying according to claim 1, characterized in that said device for dehumidifying comprises at least a first sealing element and a second sealing element arranged on the mobile plug so that the second sealing element is able to seal the outlet when the mobile plug is in the first position and the first sealing element is able to seal the inlet when the mobile plug is in the second position.

13. Device for dehumidifying according to claim 1, characterized in that the box is provided with a round shape.

14. Vehicle headlamp comprising at least a closed casing housing a light source,
characterized in that said vehicle headlamp comprises a device for dehumidifying according to claim 1, said device for dehumidifying being able to dehumidify the closed casing by being arranged on the vehicle headlamp so that the chamber of the box communicates with the interior of the closed casing via the inlet and communicates with the exterior of the closed casing via the outlet.

* * * * *